(12) United States Patent
Ohkura

(10) Patent No.: US 6,604,884 B1
(45) Date of Patent: Aug. 12, 2003

(54) JOINT STRUCTURE FOR EXTRUDED MEMBERS

(75) Inventor: Kenji Ohkura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 140 days.

(21) Appl. No.: 09/644,577

(22) Filed: Aug. 24, 2000

(30) Foreign Application Priority Data

Aug. 26, 1999 (JP) ............................................ 11-239186
Aug. 27, 1999 (JP) ............................................ 11-240723

(51) Int. Cl.7 ..................... B60R 19/03; B62D 27/02; B21D 39/00; B21C 23/14
(52) U.S. Cl. ..................... 403/187; 403/232.1; 403/237
(58) Field of Search ................................ 403/187, 188, 403/192, 232.1, 237, 257

(56) References Cited

U.S. PATENT DOCUMENTS

| 3,969,031 A | 7/1976 | Kroopp ....................... 403/239 |
| 4,787,181 A | * 11/1988 | Witten et al. ................. 52/79.1 |
| 5,716,155 A | * 2/1998 | Yoshida et al. .............. 403/187 |
| 6,217,251 B1 | * 4/2001 | Kato et al. ................... 403/341 |
| 6,296,300 B1 | * 10/2001 | Sato ............................ 296/189 |

FOREIGN PATENT DOCUMENTS

| AU | 1237611968 | 1/1977 |
| AU | 596917 | 5/1989 |
| DK | WO 84/04139 | 10/1984 |
| JP | 5-8758 | 1/1993 |
| JP | 7-80570 | 3/1995 |
| WO | WO 90/10766 | 9/1990 |
| WO | WO 97/48909 | 12/1997 |

\* cited by examiner

Primary Examiner—Christopher J. Novosad
(74) Attorney, Agent, or Firm—Arent Fox Kintner Plotkin & Kahn, PLLC

(57) ABSTRACT

A front side frame is disposed with one end portion in the axial direction butted against the side surface of a front bumper beam. A joint member is provided therebetween. The front bumper beam and the joint member are coupled by screwing nuts provided in the end plate part and coupling bolts. Clips with a nut are spring-engaged to either of coupling pieces of the joint member or the outer wall of the side frame. The front side frame and the joint member are coupled by coupling bolts by screwing.

5 Claims, 5 Drawing Sheets

JOINT STRUCTURE FOR EXTRUDED MEMBERS

BACKGROUND OF THE INVENTION

1. Field of the Invention

The present invention relates to a joint structure for extruded members for the joint with the end portion of a first extruded member butted against the side surface of a second extruded member, and a mounting structure for a traction hook for mounting a traction hook on the front surface of a bumper beam being the extruded member.

2. Description of the Related Art

Conventionally, there have been automobiles comprising a frame made of an aluminum alloy extruded member. According to the frame structure, extruded members need to be jointed at a junction of the members as disclosed in, for example, JPA-7-80570. Various joint methods for the extruded members have been proposed, depending on the part. Examples thereof are presented below.

For example, members are butted and welded in a tail gate part, between a side sill and a front floor cross member, or in a door upper sash. Members are welded each to a cast part disposed therebetween, between a rear floor cross member and a rear frame, or between a rear frame and a side sill. Extruded members are welded with respect to a connecting part press worked like a waffle, covering over the joint part of both members, between a roof rail and a front pillar, or between a pillar lower and a front pillar.

However, according to the coupling by welding as mentioned in the examples, a problem is involved in that the strength of the material is deteriorated at the welded part with respect to the extruded members due to the thermal effect. Moreover, in the case the welding structure is used for a portion to be repaired frequently so as to be replaced by a repair part, the repair cost is soared so as to increase the burden on the user. Furthermore, in the case of those using a connecting part press worked like a waffle, since the extruded members are jointed only on the surface, and thus a problem is involved in that it is difficult to improve the coupling strength with respect to the extruded members, using a small connecting part.

In addition, conventionally, there have been traction hooks provided on the front and rear end portions of an automobile for the traction at the time of breakdown of the automobile, or the like. Examples thereof include those having a plate elongating downward, provided on the front end portion of a front side frame via a bracket, with a hook hole formed in the plate so as to serve as a traction hook. According to the structure, a problem is involved in that the weight is increased due to bulkiness of the bracket and the plate.

In contrast, those comprising a frame made of an aluminum alloy material have been provided in order to further realize the light weight of the automobile. Among these car bodies, for example, JP-A-5-8758 discloses those having a bumper beam also comprising an aluminum alloy extruded member.

However, in the case of mounting a traction hook to the aluminum alloy bumper beam, a steel material cannot be welded thereto. Also in the case of the aluminum alloy material, a problem arises in difficulty in welding, and a high cost.

Moreover, in the case of forming a traction hook with an eye bolt-like shape, although the traction hook can be mounted on the bumper beam by screwing, since the screw hole strength is low in the case of those made from the aluminum alloy as mentioned above, a problem is involved in that the traction hook cannot be mounted directly on the bumper beam by screwing.

SUMMARY OF THE INVENTION

In view of the above problems, an object of the invention is to facilitate detachment and assembly in replacing parts as well as to realize the compactness in the joint structure for extruded members. Further, another object of the invention is to realize a mounting structure for a traction hook, capable of providing a sufficient strength even in the case an aluminum alloy bumper beam is used as well as capable of restraining the weight increase.

To solve the above object, according to a first aspect of the invention, there is provided a joint structure for extruded members for the joint with the end portion of a first extruded member butted against the side surface of a second extruded member, wherein the extruded members are jointed with each other via a joint member coupled to the end portion and the side surface by fastening means.

According to the configuration, since the joint with the extruded members butted with each other is executed with the fastening means, the thermal effect with respect to the extruded members in the joint by welding can be eliminated as well as detachment and assembly can be facilitated in replacing the parts.

Moreover, since the joint member comprises a first coupling piece to be superimposed on a part of the end portion, and a second coupling piece to be superimposed on a part of the side surface, with each of the coupling pieces coupled with the corresponding end portion and side surface by the fastening means, the coupling efficiency can be improved according to coupling with the coupling pieces of the joint member inserted and superimposed in the end portion of the other extruded member as well as the amount of projection of the joint member outward from the extruded members restrained at a minimum level.

Further, according to the second aspect of the invention, there is provided amounting structure for a traction hook for mounting a traction hook on the front surface of a bumper beam, wherein an operation hole for allowing the operation from the front surface side of the bumper beam at the time of coupling a frame component member by screwing onto the rear surface of a bumper beam is provided on the front surface of the bumper beam, and a metal fixture for mounting the traction hook is coupled with the bumper beam by screwing so as to close the operation hole.

According to the configuration, since the metal fixture for mounting the traction hook is provided so as to close the frame component member coupling operation hole provided in the front bumper beam by screwing at the time of mounting the traction hook onto the front bumper beam comprising an aluminum alloy extruded member for further achieving the light weight of the car body, the front bumper beam is not applied with the thermal effect by welding. Furthermore, since the traction hook is mounted directly on the metal fixture, a bracket is not required, and thus the light weight and the low cost can further be achieved. Moreover, since the operation hole can be closed by the metal fixture, the rigidity of the portion can be improved.

Furthermore, since a bolt part is provided in the traction hook as well as a hook mounting nut for screwing the bolt part therein is provided in the metal fixture, with the hook mounting nut provided facing outward from the operation hole, in the case the operation hole for coupling the front bumper beam and the frame component member by screwing is provided in the front bumper beam, the operation hole can be utilized preferably as the traction hook mounting portion.

DETAILED DESCRIPTION OF THE PREFERRED EMBODIMENTS

Hereinafter, an embodiment of the invention will be explained specifically with reference to the accompanied drawings.

Figure 1:
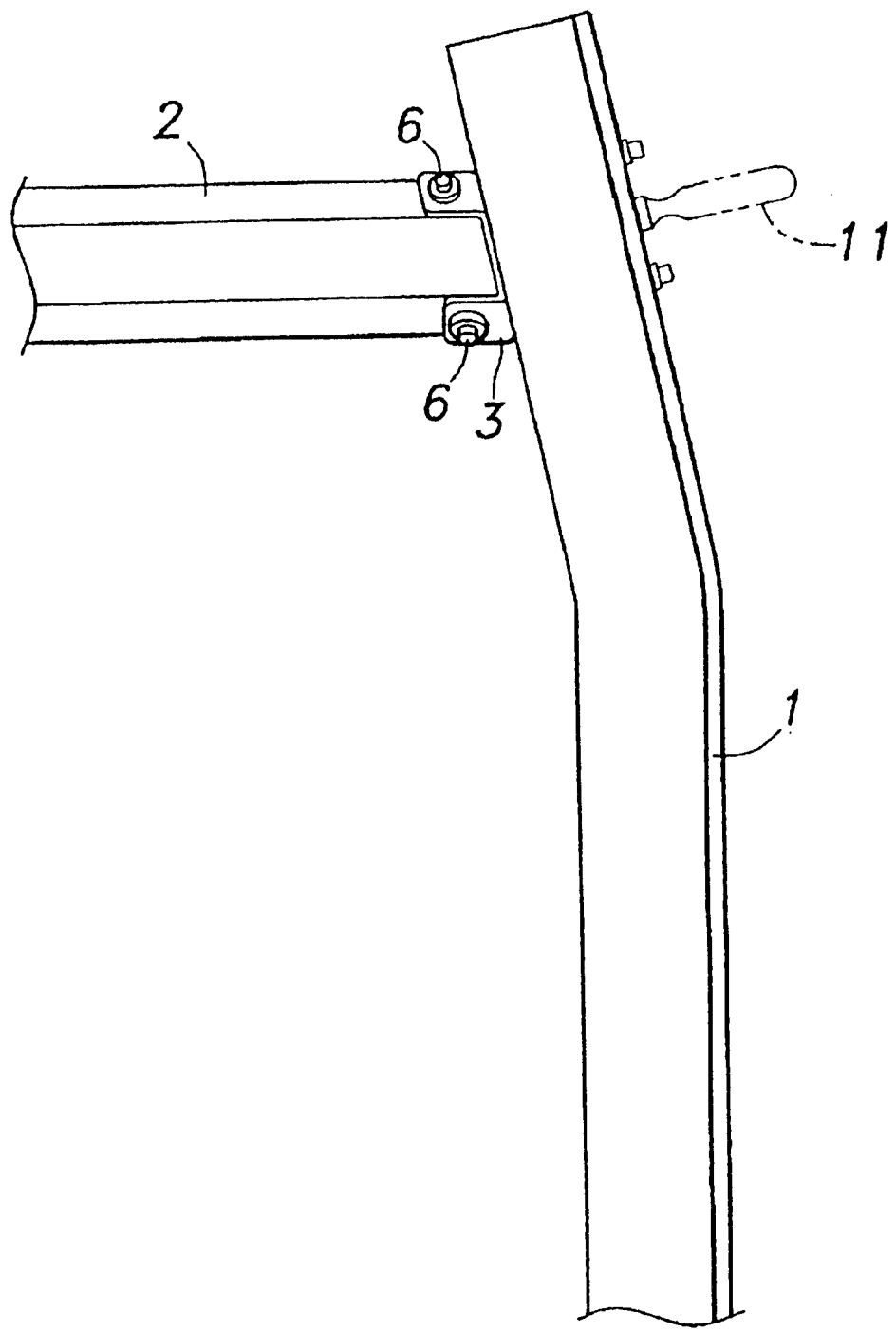
FIG. 1 is a plan view showing the joint state of a front bumper beam and a front side frame according to the invention.

FIG. 1 is a plan view showing a front bumper beam 1 as a first extruded member and a part of a front side frame 2 as a second extruded member being the stay thereof according to the first embodiment of the invention. As shown in the figure, a traction hook 11 according to the invention is provided on the automobile front side (right side in the figure) of the front bumper beam 1. Since the traction hook 11 is detachable, it is mounted integrally on the front bumper beam 1 at the time of use.

Figure 2:
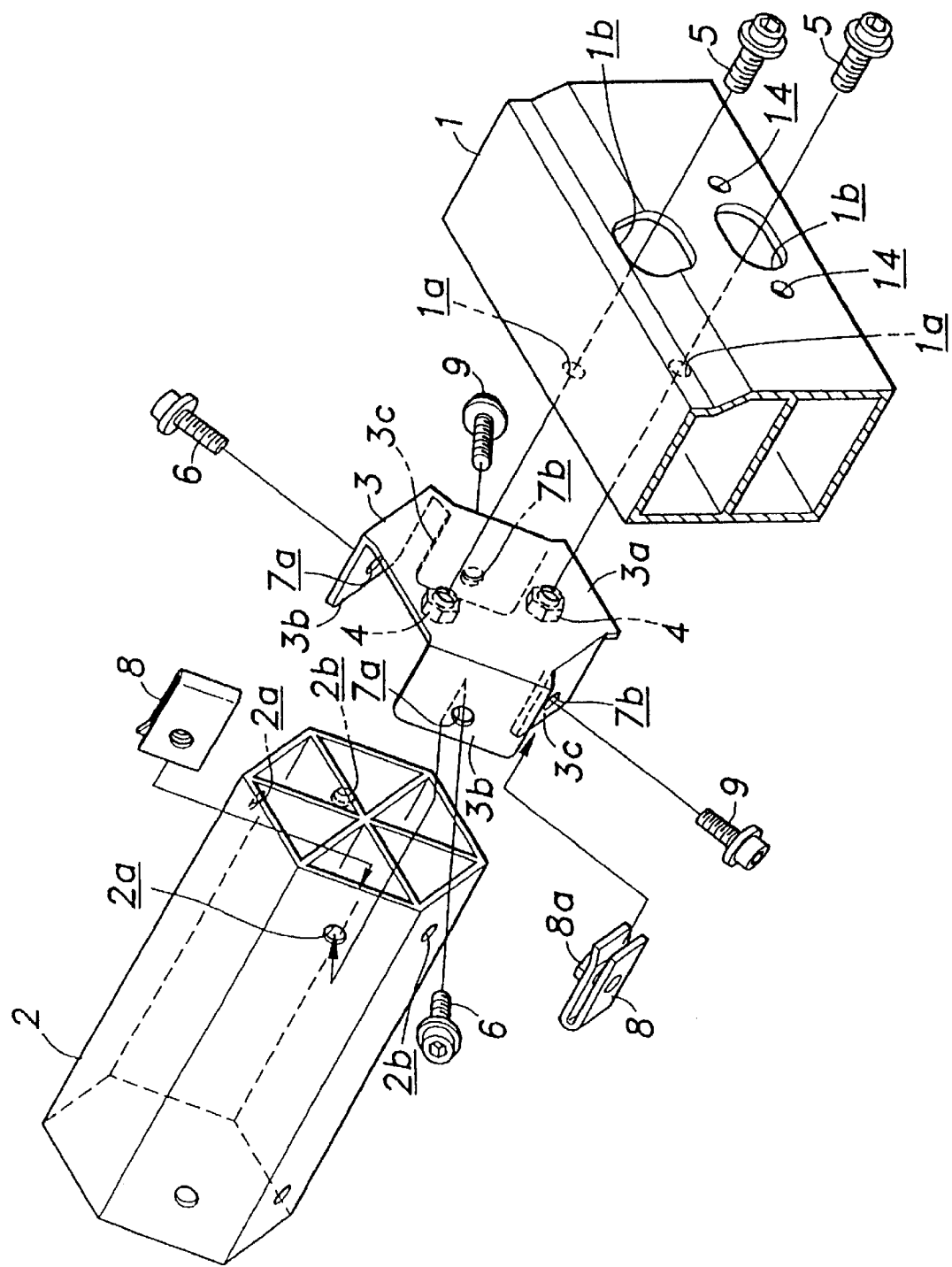
FIG. 2 is a principal part exploded assembly perspective view of the front bumper beam and the front side frame.

As shown in FIG. 2, the front bumper beam 1 comprises an aluminum alloy extruded member having a substantially eight-like cross-sectional shape, and the front side frame 2 comprises an aluminum alloy extruded member having a hexagonal cross-sectional shape, divided into six equal sections.

As shown in FIG. 1, they are provided such that one axial direction end portion of the front side frame 2 is butted against the side surface of the front bumper beam 1 in the vicinity of the right and left side parts of the automobile. These members (1, 2) are jointed by screwing to a joint member 3 as a frame component member provided therebetween so as to achieve the integral joint of the front bumper beam 1 and the front side frame 2 with each other. The joint member 3 maybe a press worked product of an iron sheet because a sufficient strength can be obtained with a thin sheet material.

As shown in FIG. 2, the joint member 3 comprises an end plate part 3a as a second coupling piece having a substantially hexagon-shape, corresponding to the hexagonal cross-sectional shape of the front side plate 2, and two pairs of coupling pieces 3b, 3c as first coupling pieces bent by the right angle so as to elongate from two sides of the end plate part 3a symmetrical with each other. A coupling piece is not provided on the other two sides of the end plate part 3a.

The joint member 3 is mounted in the state with the end plate part 3a contacted with the side surface of the front bumper beam 1 such that the space between the two sides not provided with the coupling piece is oriented in the front bumper beam 1 height direction. Nuts 4 are fixed at upper and lower predetermined positions on the rear surface of the end plate part 3a by welding as well as bolt inserting holes 1a for inserting coupling bolts 5 therethrough are provided on the front bumper beam 1 at the corresponding positions of the automobile rear side surface. Furthermore, tool inserting operation holes 1b are provided on the front bumper beam 1 at the corresponding positions of the automobile front side surface.

Therefore, the operation of inserting a tool (not illustrated) into the tool inserting operation holes 1b for screwing the coupling bolts 5 can be executed. As shown in FIG. 2, the end plate part 3a of the joint member 3 is coupled with the front bumper beam 1 by screwing the coupling bolts 5 into the nuts 4.

The joint member 3 and the front side frame 2 are coupled with the coupling pieces 3b, one of the pairs of the coupling pieces 3b, 3c, superimposed on two outer surfaces of the hexagonal outer wall of the front side frame 2. Bolt inserting holes 7a are formed in the coupling pieces 3b for inserting coupling bolts 6 therethrough as well as bolt inserting holes 2a are formed in the outer wall of the front side frame 2 at the corresponding positions. U-shaped clips with a nut 8 (only one of them is illustrated) are mounted on the outer wall corresponding to the bolt inserting holes 2a by spring engagement.

Figure 3:
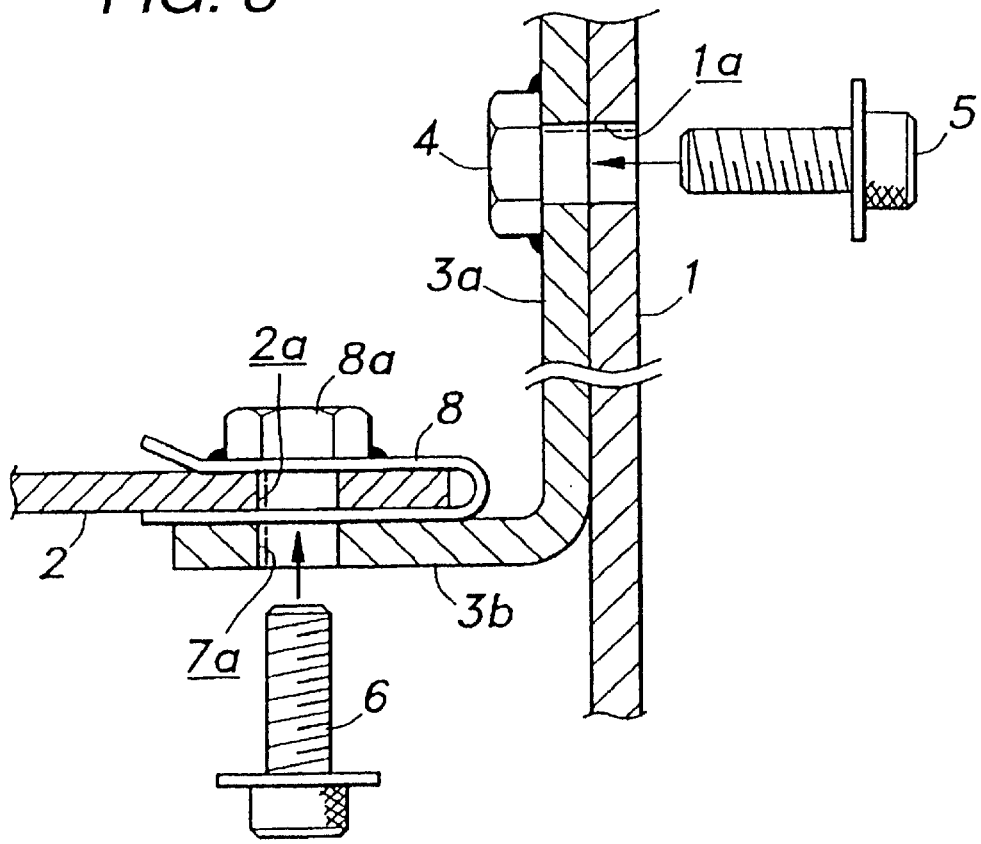
FIG. 3 is a principal part enlarged cross-sectional view showing the joint state of the front bumper beam and the front side frame with respect to the joint member.

As to coupling of the coupling pieces 3b and the corresponding outer wall of the front side frame 2, as shown in FIG. 3, clips 8 are temporarily attached on the outer wall of the front side frame 2 according to the spring engagement, and the axial direction end portion of the front side frame 2 is displaced relatively toward the end plate part 3a such that the coupling pieces 3b are disposed outside the outer wall. Then, by screwing the coupling bolts 6 inserted through the bolt inserting holes 7a, 2a into the nuts 8a of the clips 8, the front side frame 2 and the coupling pieces 3b of the joint member 3 are coupled.

Moreover, the coupling pieces 3c, which are the other pair of the coupling pieces 3b, 3c, are formed so as to be superimposed on two inner surfaces of the hexagonal outer wall of the front side frame 2 at the time of displacing the front side frame 2 toward the end plate part 3a. Bolt inserting holes 7b are formed in the coupling pieces 3c for inserting coupling bolts 9 therethrough as well as bolt inserting holes 2b are formed in the outer wall of the front side frame 2 at the corresponding positions as well. Clips 8 that may have the same shape as the above-mentioned clips 8 (only one of them is illustrated) are mounted on the coupling pieces 3c by spring engagement.

Figure 4:
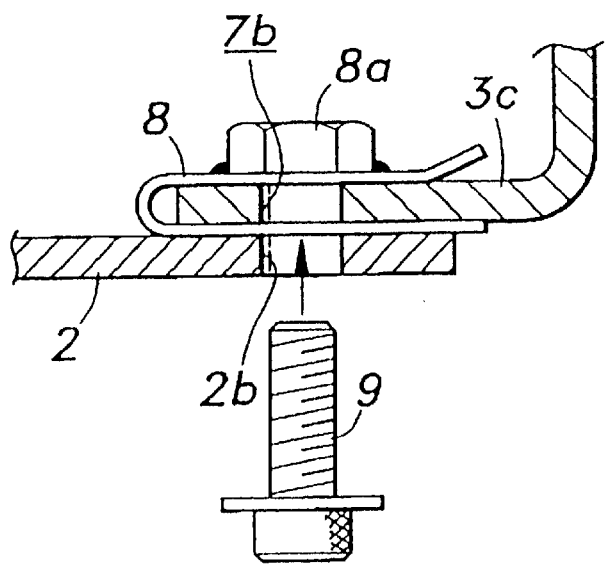
FIG. 4 is a principal part enlarged cross-sectional view showing the joint operation of the front side frame and the joint member.

As to coupling of the coupling pieces 3c and the corresponding outer wall of the front side frame 2, as shown in FIG. 4, the clips 8 are temporarily attached on the coupling pieces 3c according to the spring engagement, and the axial direction end portion of the front side frame 2 is displaced as mentioned above such that the coupling pieces 3c are disposed inside the outer wall. By screwing the coupling bolts 9 inserted through the bolt inserting holes 2b, 7b into the nuts 8a of clips 8, the front side frame 2 and the coupling pieces 3c of the joint member 3 are coupled with each other.

Accordingly, since the end portion of the front side frame 2 is jointed on the side surface of the front bumper beam 1 via the joint member 3 with the joint operation executed by screw coupling of the fastening means, even in the case both members need to be detached for repair, they can be disassembled easily without any inconvenience. Therefore, the front bumper beam 1 and the front side frame 2 can be made of aluminum alloy extruded members, and thus the automobile frame can be formed with an aluminum alloy extruded member as much as possible.

Since the joint member 3 in the invention is a press worked product, it is not as thick as a cast part so that the cost per weight is low as well as it can be provided by relatively inexpensive equipment compared with expensive casting equipment, and thus it is advantageous.

Figure 5:
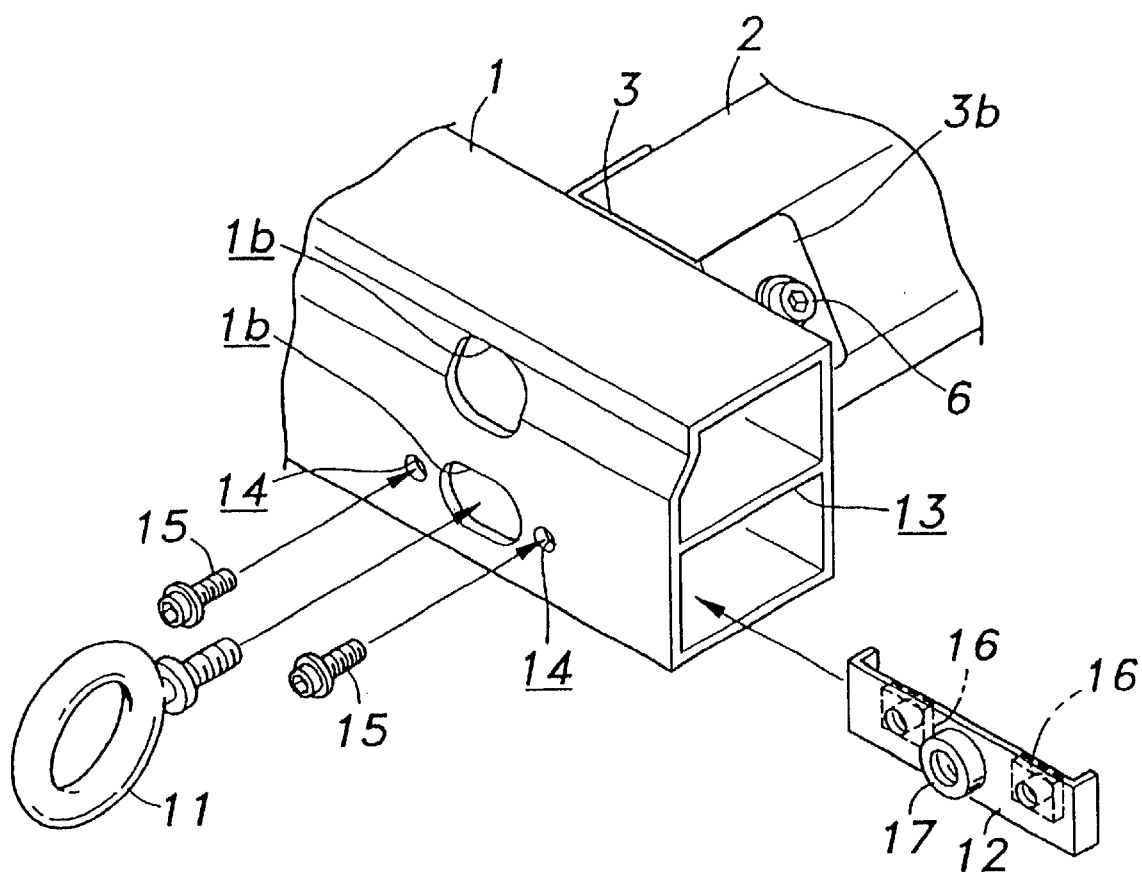
FIG. 5 is a principal part assembly perspective view of a traction hook and a plate.

Next, with reference to FIGS. 5 and 6, the mounting operation of a traction hook 11 according to the invention will be described. As shown in FIG. 5, the traction hook 11 has an eye bolt-like shape. As shown in the imaginary line in FIG. 1, this is to be mounted on the front bumper beam 1 for use.

Figure 6:
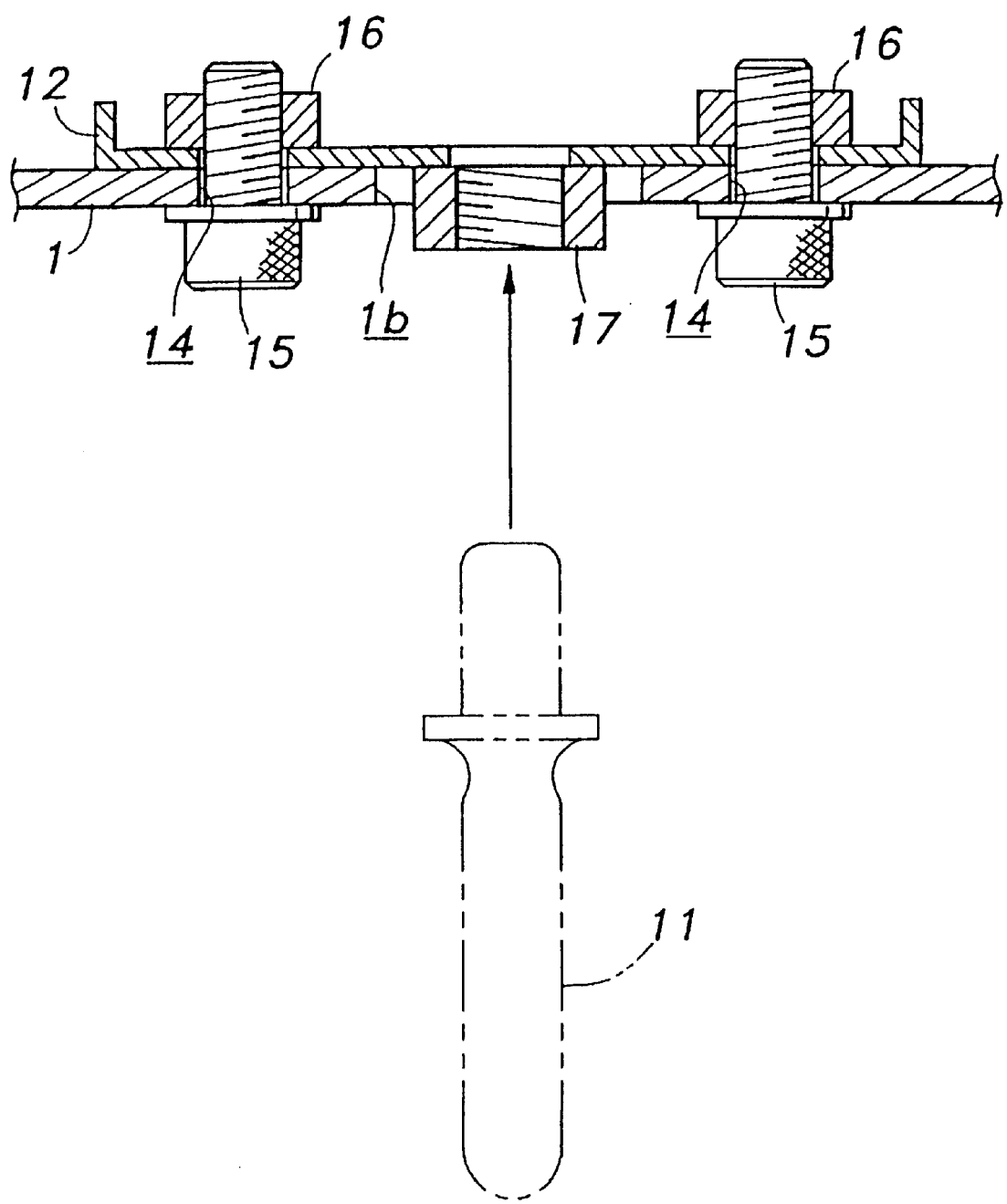
FIG. 6 is a principal part enlarged cross-sectional view showing the mounting operation of the traction hook and the plate.

As shown in FIG. 6, the front bumper beam 1 is provided with a hook supporting plate 12 as a metal fixture on the rear surface side of the wall provided with the lower operation hole 1b of the front bumper beam 1 (in the front bumper beam 1). The hook supporting plate 12 is inserted from an opening 13 at the axial direction end portion of the front bumper beam 1 so as to be fixed in the front bumper beam 1 by mounting bolts 15 inserted through screw inserting holes 14 provided on both right and left side parts of the lower side operation hole 1b of the front bumper beam 1.

Nut members 16 capable of screwing the mounting bolts 15 therethrough are provided on the rear surface of the plate 12 (inside the front bumper beam 1) at the corresponding positions by welding. Moreover, a hook mounting nut 17 is fixed by welding on the surface of the plate 12 so as to face outward from the operation hole 1b when the plate 12 is mounted, projecting to the automobile front side. A bolt part 11a of the traction hook 11 is to be screwed into the hook mounting nut 17.

The plate 12 may be provided as a steel sheet press worked in a flat U shape. By using an iron material for the plate 12, the nut members 16 and the hook mounting nut 17 to be weldable to the iron material can be used. These are accessible easily and inexpensively.

As shown in FIG. 6, in the state with the traction hook 11 not in use, only the plate 12 is coupled with the front bumper beam 1 by screwing. As mentioned above, the hook mounting nut 17 faces outward from the operation hole 1b. The operation hole 1b can be closed by the plate 12. Therefore, the front bumper beam 1 is reinforced by the plate 12 so that the rigidity of the front bumper beam 1 can be improved preferably.

Accordingly, since the traction hook mounting plate 12 is mounted by screwing on the front bumper beam 1 comprising an aluminum alloy extruded member for further achieving the light weight of the car body, the front bumper beam 1 is not affected by the thermal effect in welding so that the collision deformation characteristics can be obtained as the designed value. Furthermore, since the plate 12 is fixed on the front bumper beam 1 directly, a bracket is not required so that the light weight and the low cost can further be achieved. Moreover, since the operation hole 1b for coupling the front bumper beam 1 on the front side frame 2 by screwing can be closed by the plate 12, the rigidity of the portion can be improved.

Although, as to a mounting structure of the traction hook 11, the front bumper beam 1 has been explained in this embodiment, the invention can also be adopted in a rear bumper beam.

Moreover, as to a joint structure for extruded members, the invention is not limited to coupling of the front bumper beam 1 and the front side frame 2, but can be adopted in various coupling portions with two extruded members butted with each other, for example, in a tail gate part, between a side sill and a front floor cross member, in a door upper sash, between a rear floor cross member and a rear frame, between a rear frame and a side sill, between a roof rail and a front pillar, or between a pillar lower and a front pillar.

According to a first aspect of the invention, since the extruded members to be jointed in the butted state are jointed by screw coupling, they are not affected by the thermal effect in welding, and thus the joint strength of the extruded members can be improved preferably as well as detachment and assembly in replacing parts can be facilitated. Moreover, in the case a press worked product is used as the joint member, the effect of reducing the cost per unit weight can further be achieved compared with the case of using a cast product as the joint member. Furthermore, since the coupling operation can be executed with the coupling pieces of the joint member inserted and superimposed in the end portion of the other extruded member as well as the amount of projection of the joint member outward from the extruded members is restrained at a minimum level, the compactness can be improved so as to improve the coupling efficiency.

According to the second aspect of the invention, since the metal fixture for mounting the traction hook on the front bumper beam comprising an aluminum alloy extruded member for further achieving the light weight of the car body is provided so as to close the operation hole provided in the front bumper beam by screwing, the front bumper beam is not affected by the thermal effect in welding so that the collision deformation characteristics can be obtained as the designed value. Furthermore, since the traction hook is mounted on the metal fixture directly, an extra bracket is not required so that the light weight and the low cost can further be achieved. Moreover, since the operation hole can be closed by the metal fixture, the rigidity of the portion can be improved. Furthermore, since the hook mounting nut provided on the metal fixture can face to the operation hole in the case the operation hole for coupling by screwing the front bumper beam and the frame component member is provided in the front bumper beam, the operation hole can be used preferably as the traction hook mounting portion.

While only certain embodiments of the invention have been specifically described herein, it will apparent that numerous modifications may be made thereto without departing from the spirit and scope of the invention.

The present disclosure relates to the subject matter contained in Japanese-Patent Application Nos. Hei.11-239186 filed on Aug. 26, 1999 and Hei.11-240723 filed on Aug. 27, 1999, which are expressly incorporated herein by reference in its entirety.

What is claimed is:

1. A structure for joining first and second extruded members while butting an end portion of the first extruded member against a side surface of the second extruded member, wherein the first and second extruded members are jointed with each other via a joint member coupled to the end portion of the first extruded member and the side surface of the second extruded member by fastening members, and wherein the fastening members include a bolt, and an elastic clip with a nut nipping an outer wall in the end portion of the first extruded member.

2. The structure according to claim 1, wherein the joint member comprises a first coupling piece to be superimposed on a part of the end portion of the first extruded member, and a second coupling piece to be superimposed on a part of the side surface of the second extruded member, the first and second coupling pieces are respectively coupled with the corresponding end portion and side surface by fastening members.

3. The structure according to claim 1, wherein the first and second extruded members are made of an aluminum alloy.

4. The structure according to claim 1, wherein the first and second extruded members form a part of a frame of a vehicle.

5. A structure for joining first and second extruded members while butting an end portion of the first extruded member against a side surface of the second extruded member, wherein the first and second extruded members are jointed with each other via a joint member coupled to the end portion of the first extruded member and the side surface of the second extruded member by fastening members, and wherein the fastening members include a bolt, and an elastic clip with a nut nipping an outer wall in the end portion of the first extruded member, and wherein the joint member comprises a first coupling piece to be superimposed on a part of the end portion of the first extruded member, and a second coupling piece to be superimposed on a part of the side surface of the second extruded member, and wherein the first and second coupling pieces are respectively coupled with the corresponding end portion and side surface by fastening members, and wherein an operation hole for allowing operation from a surface side opposite to the side surface of the second extruded member at the time of threadedly coupling the end portion of the first extruded surface onto the side surface of the second extruded member is provided on the surface side opposite to the side surface of the second extruded member.

* * * * *